(12) United States Patent
Yun

(10) Patent No.: US 12,543,672 B2
(45) Date of Patent: Feb. 10, 2026

(54) NUTRIENT SOLUTION RECYCLING PLANT CULTIVATION SYSTEM

(71) Applicant: SHERPA SPACE INC., Daejeon (KR)

(72) Inventor: Choa Mun Yun, Daejeon (KR)

(73) Assignee: SHERPA SPACE INC., Daejeon (KR)

( * ) Notice: Subject to any disclaimer, the term of this patent is extended or adjusted under 35 U.S.C. 154(b) by 12 days.

(21) Appl. No.: 17/929,735

(22) Filed: Sep. 5, 2022

(65) Prior Publication Data

US 2023/0380337 A1 Nov. 30, 2023

(30) Foreign Application Priority Data

May 30, 2022 (KR) .......................... 10-2022-0066264

(51) Int. Cl.
*A01G 31/02* (2006.01)
*A01G 9/24* (2006.01)
*G01N 21/84* (2006.01)

(52) U.S. Cl.
CPC ............. *A01G 31/02* (2013.01); *A01G 9/247* (2013.01); *G01N 2021/8466* (2013.01)

(58) Field of Classification Search
CPC .................. A01G 9/247; A01G 27/003; A01G 2031/006; A01G 31/02
See application file for complete search history.

(56) References Cited

U.S. PATENT DOCUMENTS

| | | | |
|---|---|---|---|
| 9,144,206 B1 * | 9/2015 | Rubanenko | A01G 31/02 |
| 11,219,173 B2 * | 1/2022 | Campau | A01G 31/02 |
| 2013/0035774 A1 * | 2/2013 | Warren | A01G 25/167 |
| | | | 700/90 |
| 2017/0035002 A1 * | 2/2017 | Ellins | A01G 31/02 |
| 2017/0208757 A1 * | 7/2017 | Valmont | B01F 23/451 |
| 2017/0325427 A1 * | 11/2017 | Straight | A01K 63/04 |
| 2018/0132434 A1 * | 5/2018 | Fu | C02F 9/00 |
| 2019/0021247 A1 * | 1/2019 | Boerema | A01G 31/00 |
| 2020/0323157 A1 * | 10/2020 | English | A01G 7/00 |
| 2020/0396917 A1 * | 12/2020 | Olesen | A01G 27/001 |
| 2021/0127609 A1 * | 5/2021 | Brake, Jr. | A01G 31/02 |
| 2022/0142067 A1 * | 5/2022 | Chernov | A01G 9/20 |
| 2022/0272912 A1 * | 9/2022 | Rand | A01G 24/10 |
| 2023/0024142 A1 * | 1/2023 | Sobrado Pauly | A01G 31/00 |

(Continued)

FOREIGN PATENT DOCUMENTS

EP 3944755 A1 7/2021
KR 10-2013-0073930 A 7/2013

(Continued)

OTHER PUBLICATIONS

EESR dated May 17, 2023.

*Primary Examiner* — Joshua D Huson
*Assistant Examiner* — Edgar Reyes
(74) *Attorney, Agent, or Firm* — Harvest IP Law, LLP

(57) ABSTRACT

The present invention relates to a nutrient solution recycling plant cultivation system, which recycles and supplies a cultivation nutrient solution and measures in real time the composition of each nutrient component to be added to a waste nutrient solution through a so-called soft sensor using measured values of pH, EC, temperature, turbidity, and weight and a previously constructed estimation model instead of an expensive high-performance analyzer, thereby minimizing nutrient solution consumption while meeting a required level of accuracy.

8 Claims, 4 Drawing Sheets

(56) References Cited

U.S. PATENT DOCUMENTS

2023/0066266 A1\* 3/2023 Landis ................... A01G 31/02
2023/0121664 A1\* 4/2023 Campau ................. A01G 31/02
                                                                          47/62 R
2023/0320296 A1\* 10/2023 LaRue ................... A01G 31/02

FOREIGN PATENT DOCUMENTS

| KR | 10-2015-0056188 A | 5/2015 |
| KR | 102062081 B1 | 12/2019 |
| KR | 10-2020-0043801 A | 4/2020 |
| KR | 1020200122612 A | 10/2020 |
| KR | 10-2258740 B1 | 6/2021 |

\* cited by examiner

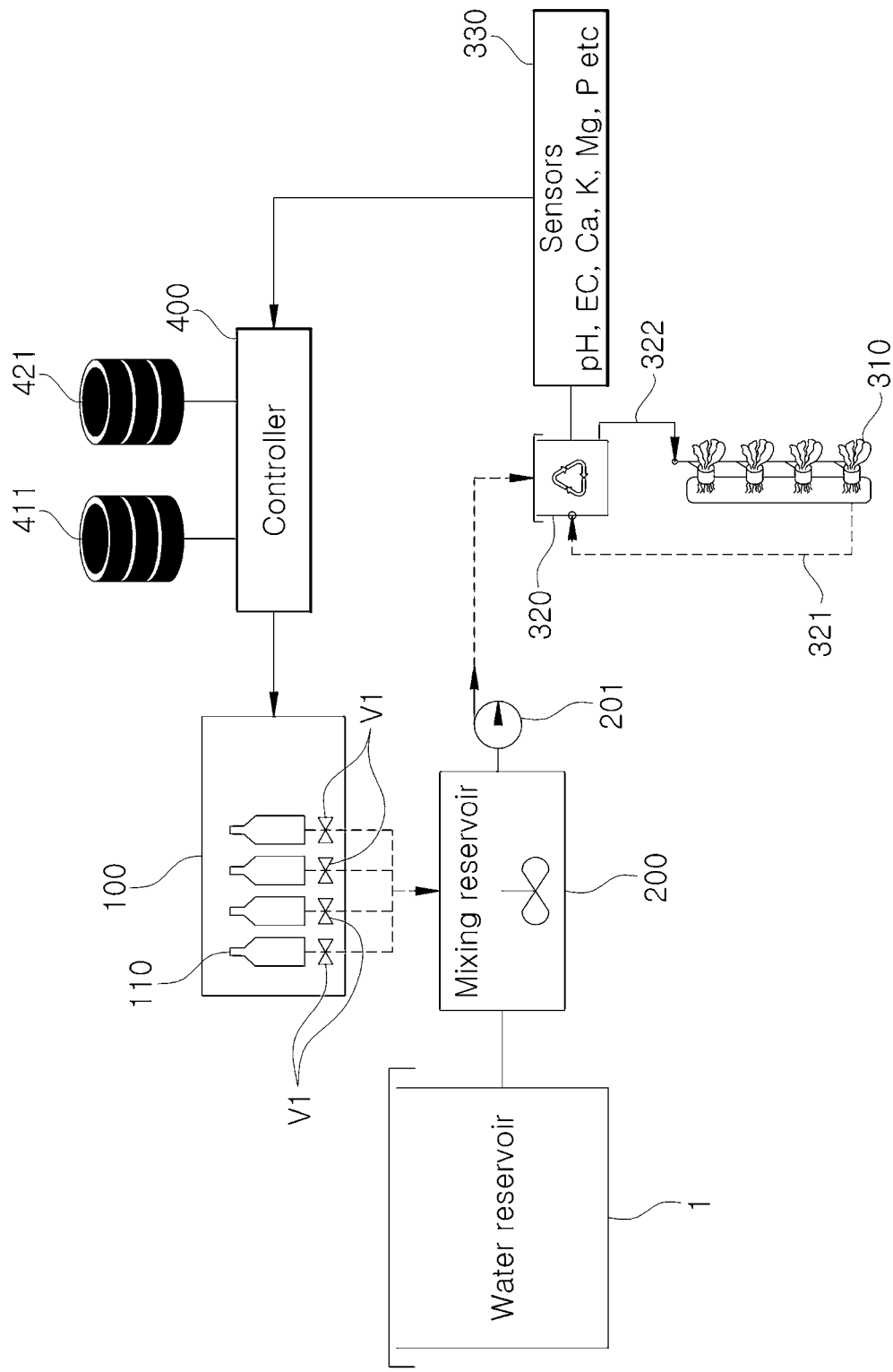

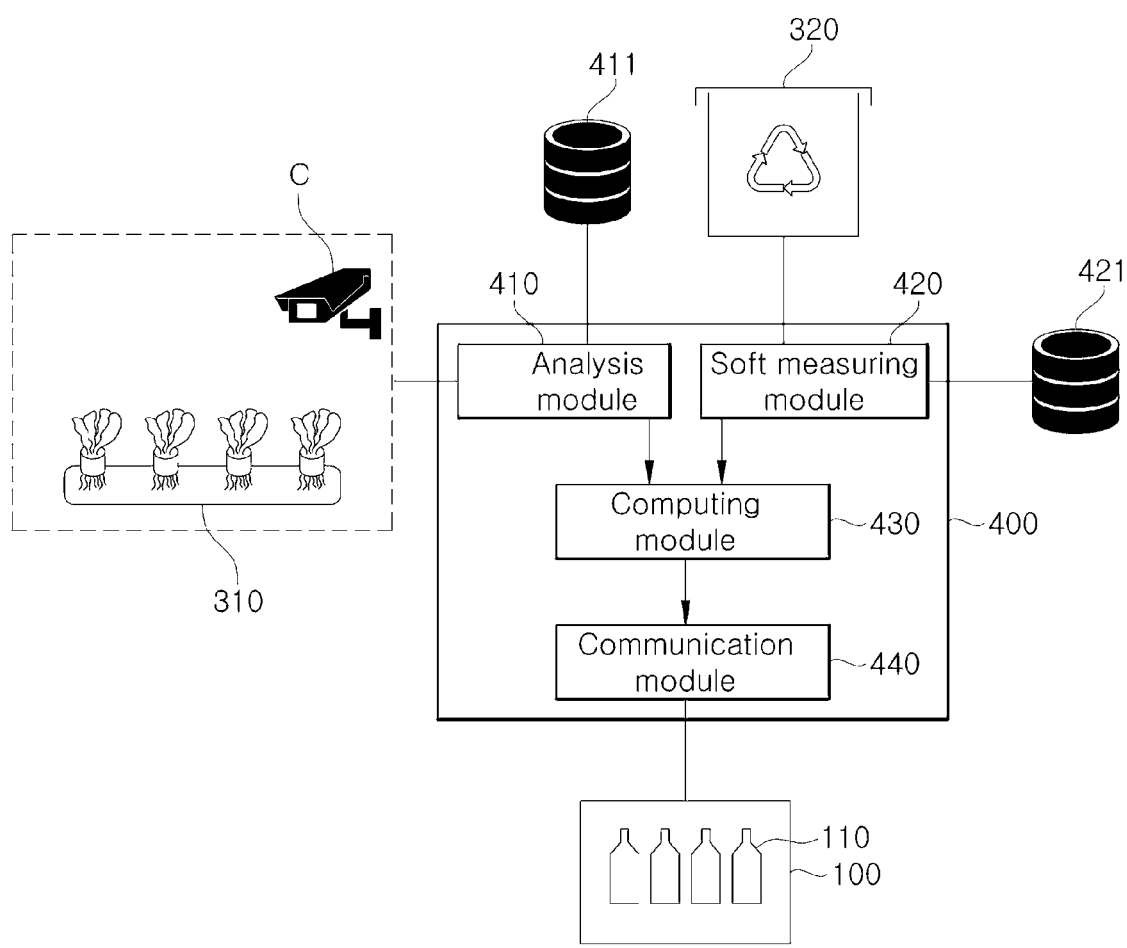
[FIG. 2]

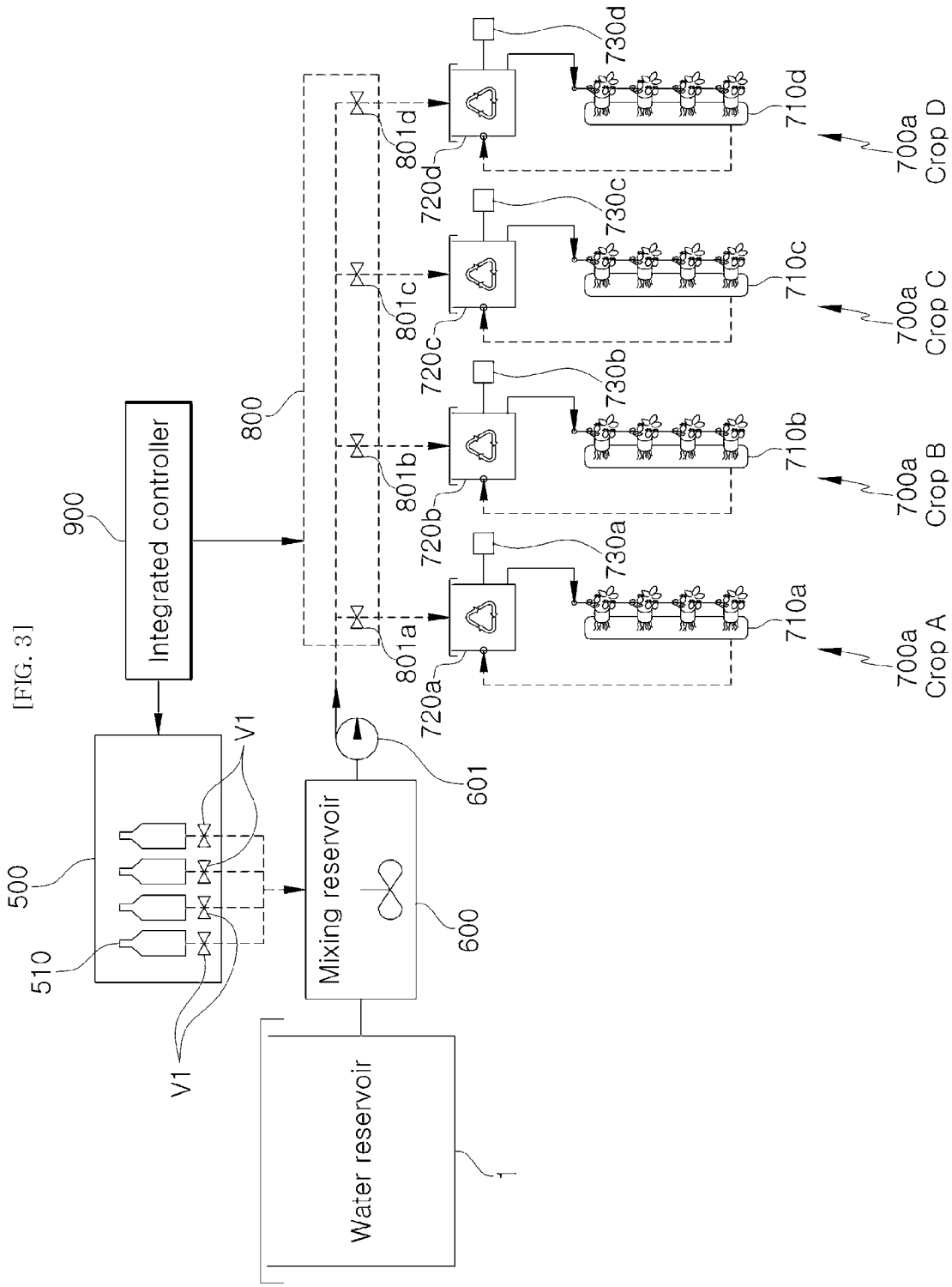

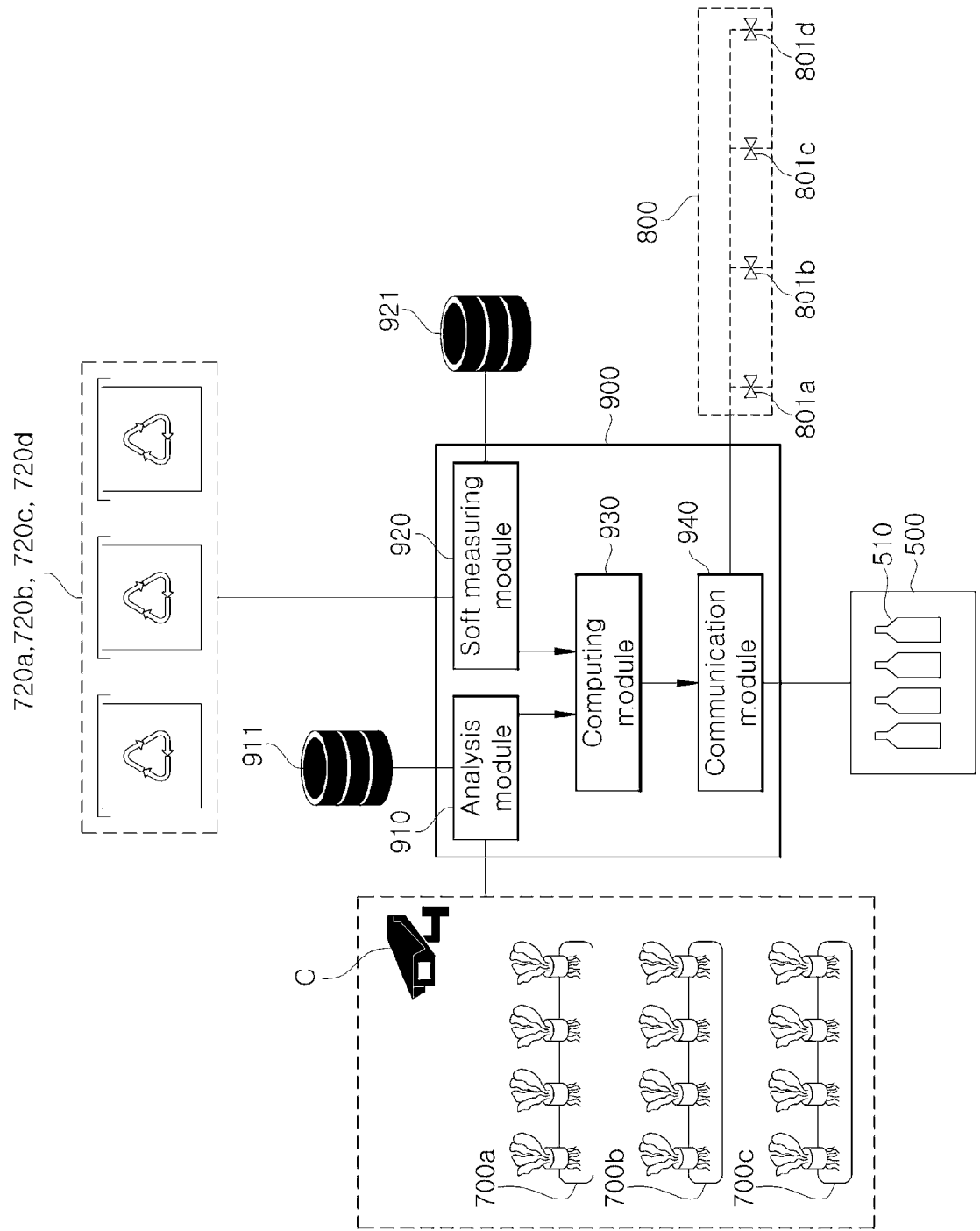
[FIG. 4]

NUTRIENT SOLUTION RECYCLING PLANT CULTIVATION SYSTEM

BACKGROUND OF THE INVENTION

Field of the Invention

The present invention relates to a nutrient solution recycling plant cultivation system, and more particularly, to a nutrient solution recycling plant cultivation system, which recycles and supplies a cultivation nutrient solution and measures in real time the composition of each nutrient component to be added to a waste nutrient solution through a so-called soft sensor using measured values of pH, EC, temperature, turbidity, and weight and a previously constructed estimation model instead of an expensive high-performance analyzer, thereby minimizing nutrient solution consumption while meeting a required level of accuracy.

Description of the Related Art

A nutrient solution provider is a device that adjusts nutrients necessary for crops to supply a nutrient solution having an appropriate concentration, and nutriculture using this device is a scientific farming technique that allows various kinds of crops to be cultivated by supplying a culture medium containing all nutrients necessary for plant growth.

Nutriculture can be used to grow plants regardless of the soil and is divided into solid medium culture and deep flow/thin-film hydroponics depending on the medium. Nutriculture is an advanced farming method that can prevent various kinds of crops from being damaged by diseases and pests and produce pollution-free plants through clean cultivation without pesticides.

In a nutrient solution supply system for nutriculture, the concentration of a nutrient solution is set in advance to suit the growth of cultivated crops, and then the concentrated nutrient solution is supplied and mixed with water to adjust the set nutrient solution concentration.

A conventional nutrient solution supply control device supplies a nutrient solution through a mechanical device, and has an operation function of changing only some supply areas, controlling only a supply time, or adjusting a supply amount, but it has difficulty in accurately controlling supply of a nutrient solution. In particular, there is a problem of supplying a nutrient solution without considering elements required for the growth of crops although the supply of the elements needs to be changed depending on the kind of crops and time.

Technology for changing a control set value of a nutrient solution provider on the basis of growth state information of crops sensed by a sensor and environmental information inside a greenhouse is disclosed in some conventional art. However, the level of accuracy of a nutrient solution in the conventional art is low because the nutrient solution is simply supplied on the basis of initial information without considering nutrients actually absorbed by crops.

SUMMARY OF THE INVENTION

Therefore, the present invention has been made in view of the above problems, and it is an object of the present invention to provide a nutrient solution recycling plant cultivation system for recycling and supplying a nutrient solution supplied for the growth of crops, which can maintain a growth environment by adding specific nutrients absorbed by crops on the basis of at least one of pH, EC, temperature, and weight measured from a waste nutrient solution and enable smooth growth of crops by additionally supplying necessary nutrients according to a growth state of crops.

In accordance with the present invention, the above and other objects can be accomplished by the provision of a nutrient solution recycling plant cultivation system, including: a nutrient solution provider including a plurality of component tanks provided for respective nutrient solution components, and control valves provided for the respective component tanks; a mixing reservoir in which an original solution supplied from the nutrient solution provider and water supplied from the outside are mixed; a collecting reservoir for collecting and storing a waste nutrient solution discharged from a cultivation bed, mixing the waste nutrient solution with the mixed nutrient solution supplied from the mixing reservoir, and circulating the mixed solution to the cultivation bed, at least one of a pH sensor, an EC sensor, a temperature sensor, a turbidity sensor, and a weight sensor being installed in the collecting reservoir; an irrigation pump for transferring the mixed nutrient solution in the collecting reservoir to the cultivation bed; and a controller including an analysis module for determining a growth state of crops, a soft measuring module for measuring a composition of each nutrient component contained in a waste nutrient solution stored in the collecting reservoir by applying at least one of the weight, acidity (pH), electrical conductivity (EC), temperature (Temp), and turbidity of the waste nutrient solution to a previously constructed nutrient component estimation model, a computing module for calculating an amount of each nutrient component to be added to the waste nutrient solution on the basis of the measured composition of the waste nutrient solution and the determined growth state of crops, and a communication module for transmitting a control signal to a control valve for each component tank of the nutrient solution provider according to the calculation result.

The nutrient solution recycling plant cultivation system may further include a purifying reservoir disposed at the front or rear end of the collecting reservoir and provided with a filter for filtering out impurities in waste nutrient solutions.

The nutrient solution recycling plant cultivation system may further include a camera for photographing crops, wherein the analysis module may determine a growth state of the crops using image data of the camera.

The growth state of the crops may include at least one of a growth stage of the crops and a disease-and-pest damage state of the crops.

At least one of a pH sensor, an EC sensor, a temperature sensor, a weight sensor, and a turbidity sensor may be installed in the mixing reservoir, and the controller may further include an adjusting module for measuring a composition of each nutrient component contained in the original solution by applying at least one of the weight, acidity (pH), electrical conductivity (EC), temperature (Temp.), and turbidity of the original solution in the mixing reservoir to the nutrient composition estimation model, comparing the measured composition of the original solution with a composition of the original solution actually supplied by the controller, and reflecting a different value according to comparison in the nutrient composition estimation model to update the estimation model.

The controller may further include an alerting module for determining that at least one of the pH sensor, the EC sensor, the temperature sensor, and the weight sensor installed in the mixing reservoir has passed a service life and providing an alarm to a user when the difference value according to comparison exceeds a preset threshold value.

In accordance with another aspect of the present invention, there is provided a nutrient solution recycling plant cultivation system, including: a nutrient solution provider including a plurality of component tanks provided for respective nutrient solution components, and control valves provided for the respective component tanks; a mixing reservoir in which an original solution supplied from the nutrient solution provider and water supplied from the outside are mixed; a plurality of growth devices including growth beds, collecting reservoirs for collecting and storing waste nutrient solutions discharged from growth beds, mixing the waste nutrient solutions with the mixed nutrient solution supplied from the mixing reservoir, and circulating the mixed solution to the growth beds, at least one of a pH sensor, an EC sensor, a temperature sensor, a turbidity sensor, and a weight sensor being installed in the collecting reservoir, and an irrigation pump for transferring the mixed nutrient solution in the mixing reservoir to the growth beds; a valve box including supply control valves installed in a piping line connecting the mixing reservoir and the collecting reservoirs of the plurality of growth devices; and an integrated controller including an analysis module for determining a growth state of crops being cultivated in each growth device, a soft measuring module for measuring a composition of each nutrient component contained in a waste nutrient solution stored in the collecting reservoir of each growth device by applying at least one of the weight, acidity (pH), electrical conductivity (EC), temperature (Temp), and turbidity of the waste nutrient solution to a previously constructed nutrient component estimation model, a computing module for calculating an amount of each nutrient component to be added to the waste nutrient solution on the basis of the measured composition of the waste nutrient solution and the determined growth state of crops, and a communication module for transmitting a control signal to the control valve and the supply control valves of the valve box of the growth devices according to the calculation result.

Each growth device may further include a purifying reservoir disposed at the front or rear end of the collecting reservoir and provided with a filter for filtering out impurities in waste nutrient solutions.

Each growth device may further include a camera for photographing crops, wherein the analysis module may determine a growth state of the crops using image data of the camera.

The growth state of the crops may include at least one of a growth stage of the crops and a disease-and-pest damage state of the crops.

At least one of a pH sensor, an EC sensor, a temperature sensor, a weight sensor, and a turbidity sensor may be installed in the mixing reservoir, and the integrated controller may further include an adjusting module for measuring a composition of each nutrient component contained in the original solution in the mixing reservoir by applying at least one of the weight, acidity (pH), electrical conductivity (EC), temperature (Temp.), and turbidity of the original solution to the nutrient composition estimation model, comparing the measured composition of the original solution with a composition of the original solution actually supplied by the controller, and reflecting a difference value according to comparison in the nutrient composition estimation model to update the estimation model.

The integrated controller may further include an alerting module for determining that at least one of the pH sensor, the EC sensor, the temperature sensor, and the weight sensor installed in the mixing reservoir has passed a service life and providing an alarm to a user when the difference value according to comparison exceeds a preset threshold value.

According to an embodiment of the present invention, it is possible to recycle and supply a nutrient solution supplied for the growth of crops, to maintain a growth environment by adding specific nutrient components absorbed by crops on the basis of at least one of pH, EC, temperature, and weight measured from a waste nutrient solution and to enable smooth growth of crops by additionally supplying necessary nutrients according to a growth state of crops.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic diagram of a nutrient solution recycling plant cultivation system according to embodiment 1 of the present invention;

FIG. 2 is a block diagram showing a configuration of a controller illustrated in FIG. 1 in detail;

FIG. 3 is a schematic diagram of a nutrient solution recycling plant cultivation system according to embodiment 2 of the present invention; and FIG. 4 is a block diagram showing a configuration of an integrated controller illustrated in FIG. 3 in detail.

DETAILED DESCRIPTION OF THE INVENTION

Hereinafter, some embodiments of the present invention will be described in detail with reference to the drawings. However, such embodiments are not intended to limit the present invention to any specific embodiment, and it should be understood that all transformations, equivalents and substitutions including the technical spirit of the present invention are within the scope of the present invention.

In the description, the singular expression includes the plural expression unless the context clearly dictates otherwise.

In the description, when a component is described as "having" or "comprising" a sub-component, other components are not excluded and it may further include other components unless mentioned otherwise.

In the description, the terms "unit," "module" and "component" mean a unit that processes at least one function or operation and may be implemented as hardware, software, or a combination thereof.

Embodiment 1

FIG. 1 is a schematic diagram of a nutrient solution recycling plant cultivation system according to embodiment 1 of the present invention.

Embodiment 1 relates to technology for recycling and supplying a nutrient solution supplied for the growth of crops, maintaining a growth environment by adding specific nutrient components absorbed by crops on the basis of at least one of pH, EC, temperature, and weight measured from a waste nutrient solution, and enabling smooth growth of crops by additionally supplying necessary nutrients according to a growth state of crops.

A plant cultivation system of embodiment 1 includes a nutrient solution provider 100, a mixing reservoir 200, a collecting reservoir 320, and a controller 400. The system may further include a camera C and an adjusting module (not shown).

The nutrient solution provider 100 includes a plurality of component tanks 110 provided for respective nutrient solution components and control valves v1 provided for the respective component tanks 110.

The number of component tanks 110 is proportional to the number of types of nutrient solution components supplied to a growth bed 310. For example, when nutrient solution components supplied to the growth bed 310 include potassium, phosphorus, calcium, magnesium, iron, and nitrogen, six component tanks 110 may be provided. The number of component tanks 110 is not limited to six as described above and may vary according to nutrient solution components supplied to the growth bed 310.

Each of the component tanks 110 is provided with the control valve v1 for determining a supply amount of an original solution stored in the component tank 110 and whether to supply the original solution. The control valve v1 is operated by the controller 400 to determine a flow rate of a nutrient solution supplied from the corresponding component tank 110 to the mixing reservoir 200 and whether to supply the nutrient solution. For example, even if the nutrient solution provider 100 is provided with a plurality of component tanks 110, only a nutrient solution stored in a component tank 110 selected by the control valve v1 is supplied to the mixing reservoir 200.

The mixing reservoir 200 supplies a mixed nutrient solution obtained by mixing a nutrient solution supplied from a component tank 110 of the nutrient solution provider 100 and water supplied from the outside to the growth bed 310. Specifically, the mixing reservoir 200 supplies the mixed nutrient solution to the growth bed 310 through the collecting reservoir 320.

The water is stored in a water reservoir 1. The water reservoir 1 may be connected to a rainwater pipe to store rainwater.

A different amount of water may be supplied to the mixing reservoir 200 from the outside depending on the components of the nutrient solutions supplied from the component tanks 110 of the nutrient solution provider 100. Further, a different amount of water may be supplied to the mixing reservoir 200 from the outside depending on the total amount of the nutrient solutions supplied from the component tanks 110 of the nutrient solution provider 100.

A pump 201 for supplying the mixed nutrient solution from the mixing reservoir 200 to the collecting reservoir 320 may be provided in a piping line connected to the mixing reservoir 200 and the collecting reservoir 320. A control valve (not shown) for determining supply of the mixed nutrient solution to the collecting reservoir 320 may be provided in the piping line connected to the collecting reservoir 320 and the mixing reservoir 200. The control valve may be controlled by the controller 400.

The collecting reservoir 320 receives and stores a waste nutrient solution discharged from the growth bed 310. The collecting reservoir 320 mixes the stored waste nutrient solution with the mixed nutrient solution supplied from the mixing reservoir 200 and circulates the mixed solution to the growth bed 310.

The collecting reservoir 320 receives the waste nutrient solution from the growth bed 310 through a recycling pipe 321, mixes the waste nutrient solution from the growth bed 310 with the mixed nutrient solution in the collecting reservoir 320 through an irrigating pipe 322, and supplies the mixed solution to the growth bed 310. The recycling pipe 321 may be provided with a collecting pump (not shown) for supplying the waste nutrient solution discharged from the growth bed 310 to the collecting reservoir 320. The irrigating pipe 322 may be provided with an irrigation pump (not shown) for supplying the mixed nutrient solution in the collecting reservoir 320 to the growth bed 310.

For example, the mixed nutrient solution supplied from the mixing reservoir 200 to the collecting reservoir 320 may vary depending on the nutrient composition of the waste nutrient solution discharged from the growth bed 310. In addition, the mixed nutrient solution supplied from the mixing reservoir 200 to the collecting reservoir tank 320 may vary depending on the growth state of crops growing in the growth bed 310. For reference, the mixed nutrient solution in the mixing reservoir 200 is supplied from the nutrient solution provider 100.

At least one of sensors 330, that is, a pH sensor, an EC sensor, a temperature sensor, a turbidity sensor, and a weight sensor, is installed in the collecting reservoir 320.

The pH sensor measures a change in the pH of the waste nutrient solution discharged from the growth bed 310 to the collecting reservoir 320, the EC sensor measures a change in the electrical conductivity of the waste nutrient solution, the temperature sensor measures the temperature of the mixed nutrient solution supplied from the collecting reservoir 320 to the growth bed 310, and the turbidity sensor measures the turbidity of the waste nutrient solution. The weight sensor measures the weight of the mixed nutrient solution or the waste nutrient solution stored in the collecting reservoir 320.

The measured values of the sensors 330 are provided to the controller 400.

The controller 400 determines the amounts of nutrient solutions in the component tanks 110 which will be added to the growth bed 310 on the basis of the measured values of the sensors 330. The controller 400 adjusts the control valve v1 of a selected component tank 110 to supply a determined amount of nutrient solution to the growth bed 310. In addition, the controller 400 may determine the amount of the nutrient solution in the component tank 110 which will be added to the growth bed 310 on the basis of the growth state of crops.

For reference, the nutrient solution in the component tank 110 selected by the controller 400 is supplied to the collecting reservoir 320 first, mixed with the waste nutrient solution in the collecting reservoir 320, and then supplied to the growth bed 310.

FIG. 2 is a block diagram showing the configuration of the controller 400 illustrated in FIG. 1.

Referring to FIG. 1 and FIG. 2, the controller 400 includes an analysis module 410, a soft measuring module 420, a computing module 430, and a communication module 440, and may further include an adjusting module (not shown) and an alerting module (not shown).

The analysis module 410 determines the growth state of crops planted in the growth bed 310.

For example, the analysis module 410 receives image data obtained by photographing crops in the growth bed 310 through the camera C installed at a position adjacent to the growth bed 310.

The analysis module 410 analyzes the image of the crops and compares at least one of the height and width of the crops, the number of leaves/fruits/flowers of the crops, the size of at least one of the leaves/fruits/flowers of the crops, and the color of the crops with data of a previously constructed growth DB 411 to determine the growth state of the crops.

The analysis module 410 analyzes the image of the crops to determine at least one of the growth stage of the crops and a disease-and-pest damage state of the crops. For example, the analysis module 410 may determine the type and progress of damage by diseases and pests by using an image analysis algorithm or by comparing the image of the crops with image data of the crops in a normal state, stored in the previously constructed growth DB 411. The method for determining the type and progress of damage by diseases and pests is not necessarily limited thereto.

The soft measuring module 420 measures the composition of each nutrient component contained in the waste nutrient solution in the collecting reservoir 320 by applying at least one of the weight, acidity (pH), electrical conductivity (EC), temperature (Temp), and turbidity of the waste nutrient solution in the collecting reservoir 320, which are measured by the sensors 330 of the collecting reservoir 320, to a nutrient composition estimation model constructed in a nutrient composition DB 421.

For example, the soft measuring module 420 may compare the measured values of the sensors 330, which are measured from the waste nutrient solution, with the nutrient composition estimation model to determine the type of a nutrient component lacking in the waste nutrient solution.

For example, when there is no or little change in the pH of the waste nutrient solution, it can be considered that the crops have hardly absorbed N ions. The soft measuring module 420 may ascertain the type of a nutrient component lacking in the waste nutrient solution through such change in the pH.

As another example, when the turbidity of the waste nutrient solution is measured to be high, the soft measuring module 420 applies the turbidity value to the nutrient composition estimation model to determine the cause of turbidity. If turbidity is caused by moss, the computing module 430 calculates the amount of each nutrient component such that a nutrient solution capable of creating an environment for removing moss is added to the collecting reservoir 320.

The computing module 430 calculates the amount of each nutrient component to be added to the waste nutrient solution circulated from the collecting reservoir 320 to the growth bed 310 on the basis of the composition of each nutrient component contained in the waste nutrient solution in the collecting reservoir 320, measured by the soft measuring module 420.

For example, when potassium is insufficient in the waste nutrient solution stored in the collecting reservoir 320 due to high absorption of potassium in the crops planted in the growth bed 310, the computing module 430 calculates a supply amount of potassium (nutrient component) to be added to the collecting reservoir 320 by the nutrient solution provider 100.

In addition, the computing module 430 may calculate the amount of each nutrient component to be added to the waste nutrient solution circulated from the collecting reservoir 320 to the growth bed 310 on the basis of the growth state of the crops determined by the analysis module 410.

For example, when the crops planted in the growth bed 310 have been damaged by diseases and pests (growth state) and thus a specific nutrient component (e.g., calcium) is further required, the computing module 430 calculates a supply amount of calcium (nutrient component) to be additionally supplied from the nutrient solution provider 100 to the collecting reservoir 320 depending on the progress of damage by diseases and pests or the type of damage by diseases and pests.

The communication module 440 transmits a signal for controlling the control valve v1 for each component tank 110 of the nutrient solution provider 100 to the control valve v1 of the nutrient solution provider 100 according to the result calculated by the computing module 430.

For example, when the computing module 430 calculates the supply amount of potassium (nutrient component) to be added to the collecting reservoir 320 by the nutrient solution provider 100, the communication module 440 transmits, to the control value v1, a control signal for controlling the flow rate of a nutrient solution supplied to the mixing reservoir 200 from the component tank 110 in which potassium is stored.

As another example, when the turbidity of the waste nutrient solution is measured to be high in the soft measuring module 420, the turbidity value is applied to the nutrient composition estimation model to determine the cause of turbidity. If the turbidity is caused by moss, the computing module 430 calculates an amount of a nutrient solution (e.g., phosphorous (P)) which can create an environment for removing moss and will be added to the collecting reservoir 320. In addition, the communication module 440 transmits, to the control valve v1, a control signal for adjusting the flow rate of the nutrient solution supplied from the component tank 110 in which phosphorus (P) is stored to the mixing reservoir 200.

As another example, if the temperature of the waste nutrient solution measured by the soft measuring module 420 exceeds a growth environment threshold value or decreases to be lower than the threshold value, the controller 400 may control the internal temperature of the collecting reservoir 320 through a temperature controller (not shown) installed in the collecting reservoir 320.

Meanwhile, a purifying reservoir including a filter for filtering out impurities in the waste nutrient solution may be additionally provided at the front or rear end of the collecting reservoir 320. Although the purifying reservoir can purify the waste nutrient solution through a physical method such as a filter, it may also purify the waste nutrient solution through a chemical method.

On the other hand, at least one of a pH sensor, an EC sensor, a temperature sensor, a weight sensor, and a turbidity sensor may be installed in the mixing reservoir 200. The controller 400 may further include an adjusting module and an alerting module.

The adjusting module measures the composition of each nutrient component contained in the original solution by applying at least one of measured values of the sensors installed in the mixing reservoir 200, that is, the weight, acidity (pH), electrical conductivity (EC), temperature (Temp.), and turbidity of the original solution in the mixing reservoir 200, to the nutrient composition estimation model.

The adjusting module compares the measured composition of the original solution with the composition of the original solution actually supplied by the controller 400 and reflects a difference value according to comparison in the nutrient composition estimation model to update the estimation model. Since the nutrient composition estimation model is continuously updated by the adjusting module, it is possible to correct measurement errors of the sensors 330 by adjusting difference values caused by differences between the estimation model constructed in the laboratory and the environment of the actual cultivation site.

For example, when the measured value of at least one of the pH sensor, the EC sensor, the temperature sensor, the weight sensor, and the turbidity sensor has an error due to deterioration of the sensor, the adjusting module adjusts the error of the corresponding sensor.

The alerting module (not shown) determines that at least one of the pH sensor, the EC sensor, the temperature sensor, and the weight sensor installed in the mixing reservoir 200 has passed the service life thereof if the difference between the composition of the original solution supplied to the mixing reservoir 200 and the composition of the actually supplied original solution, compared by the adjusting module, exceeds a preset threshold value, and provides an alarm to a user.

The controller 400 may determine the type and supply amount of a nutrient solution initially supplied from the nutrient solution provider 100 to the mixing reservoir 200 according to the growth state (or growth stage) of the crops in the growth bed 310 on the basis of a nutrient consumption model previously constructed in the nutrient composition DB 421.

The nutrient consumption model stores types and supply amounts of nutrients required depending on growth states (or growth stages) of crops, i.e., the heights and widths of crops, the numbers of leaves/fruits/flowers of crops, the size of at least one of the leaves/fruits/flowers of crops, and the colors of crops in advance.

The controller 400 determines the growth stage of the crops planted in the growth bed 310 on the basis of results of analysis of images captured by the camera C, and inputs the determined growth stage and the cultivation scale of the growth bed 310 into the nutrient consumption model. Then, the controller 400 adjusts the nutrient type and supply amount of the original solution initially supplied from the nutrient solution provider 100 to the mixing reservoir 200 by controlling the control valves V1 of the plurality of component tanks 110 provided in the nutrient solution provider 100 according to result values of the nutrient consumption model.

When the original solution is initially supplied to the mixing reservoir 200, it is possible to minimize and optimize consumption of the original solution from the beginning in addition to recycling a waste nutrient solution by providing the composition and amount of the original solution expected to be optimal according to the growth state of crops, as compared to the case of supplying the original nutrient without a special standard.

Embodiment 2

FIG. 3 is a schematic diagram of a nutrient solution recycling plant cultivation system according to embodiment 2 of the present invention.

Embodiment 2 relates to a cultivation system for satisfying a cultivation environment for small quantity and large variety, in which nutrient solutions of different compositions are supplied to a plurality of growth devices 700a, 700b, 700c, and 700d for different kinds of crops through a single nutrient solution provider 500.

At this time, the composition of nutrients is measured on the basis of at least one of the pH, EC, temperature, turbidity, and weight of a waste nutrient solution for each of the growth devices 700a, 700b, 700c, and 700d, and only an insufficient nutrition component for the kind of crop corresponding to each growth device is selectively added.

The plant cultivation system of embodiment 2 includes the nutrient solution provider 500, a mixing reservoir 600, collecting reservoirs 720a, 720b, 720c, and 720d, and an integrated controller 900. The system may further include a camera C and an adjusting module.

The nutrient solution provider 500 supplies a nutrient solution for the growth of crops to each of the growth devices 700a, 700b, 700c, and 700d, and supplementarily supplies a nutrient solution having specific components requested by the integrated controller 900. The nutrient solution supplementarily supplied from the nutrient solution provider 500 is supplied to the growth beds 710a, 710b, 710c, and 710d through the collecting reservoirs 720a, 720b, 720c, and 720d.

The nutrient solution provider 500 includes a plurality of component tanks 510 provided for respective nutrient solution components and control valves provided for the respective component tanks 510.

The number of component tanks 510 is proportional to the number of types of nutrient solution components supplied to the growth beds 710a, 710b, 710c, and 710d. For example, when nutrient solution components supplied to the growth beds 710a, 710b, 710c, and 710d include potassium, phosphorus, calcium, magnesium, iron, and nitrogen, six component tanks 510 may be provided. The number of component tanks 510 is not limited to six as described above and may vary depending on the nutrient solution components supplied to the growth beds 710a, 710b, 710c, and 710d.

Each component tank 510 is provided with a control valve for determining a supply amount of an original solution stored in the component tank 510 and whether to supply the original solution. The control valve is operated by the integrated controller 900 to determine a flow rate of a nutrient solution supplied from the corresponding component tank 510 to the mixing reservoir 600 and whether to supply the nutrient solution. For example, even if a plurality of component tanks 510 is provided in the nutrient solution provider 500, only the nutrient solution stored in the component tank 510 selected by the control valve is supplied to the mixing reservoir 600.

The mixing reservoir 600 mixes nutrient solutions supplied from the component tanks 510 of the nutrient solution provider 500 with water supplied from the outside and supplies the mixed nutrient solutions to the plurality of growth devices 700a, 700b, 700c, and 700d. Specifically, the mixing reservoir 600 supplies the mixed nutrient solutions to the collecting reservoirs 720a, 720b, 720c, and 720d provided in the respective growth devices 700a, 700b, 700c, and 700d.

The water is stored in a water reservoir 1. The water reservoir 1 may be connected to a rainwater pipe to store rainwater.

A different amount of water from the outside may be supplied to the mixing reservoir 600 depending on the components of the nutrient solutions supplied from the component tanks 510 of the nutrient solution provider 500. Further, a different amount of water from the outside may be supplied to the mixing reservoir 600 depending on the total amount of nutrient solutions supplied from the component tanks 510 of the nutrient solution provider 500.

A piping line connected to the mixing reservoir 600 and the collecting reservoirs 720a, 720b, 720c, 720d of the growth devices 700a, 700b, 700c, and 700d may be provided with a pump 601 for supplying a mixed nutrient solution from the mixing reservoir 600 to the collecting reservoirs 720a, 720b, 720c, 720d of the growth devices 700a, 700b, 700c, and 700d.

A plurality of growth devices 700a, 700b, 700c, and 700d is provided and connected to the mixing reservoir 600. The growth devices 700a, 700b, 700c, and 700d receive, from the mixing reservoir 600, nutrient components (nutrient solutions) to be added to waste nutrient solutions discharged from the growth beds 710a, 710b, 710c, and 710d.

Since the plurality of growth device 700a, 700b, 700c, and 700d may be implemented as the same device, one growth device will be described as a representative example.

The growth device 700a, 700b, 700c, or 700d includes the growth bed 710a, 710b, 710c, or 710d and the collecting reservoir 720a, 720b, 720c, or 720d.

Each of the growth beds 710a, 710b, 710c, and 710d is for growing crops, and is provided in each of the growth devices 700a, 700b, 700c, and 700d. Different kinds of crops or crops in different growth stages may be planted in the growth beds 710a, 710b, 710c, and 710d.

The collecting reservoirs 720a, 720b, 720c, and 720d may receive and store waste nutrient solutions discharged from the growth beds 710a, 710b, 710c, and 710d. The collecting reservoirs 720a, 720b, 720c, and 720d mix the stored waste nutrient solutions with a mixed nutrient solution supplied from the mixing reservoir 600 and circulate the same to the growth beds 710a, 710b, 710c, and 710d.

The collecting reservoirs 720a, 720b, 720c, and 720d receive the waste nutrient solutions through a recycling pipe, mix the waste nutrient solutions from the growth beds 710a, 710b, 710c, and 710d with the mixed nutrient solution in the collecting reservoirs 720a, 720b, 720c, and 720d, and supply the mixed solutions to the growth beds 710a, 710b, 710c, and 710d through an irrigating pipe. The recycling pipe may be provided with a collecting pump (not shown) for supplying the waste nutrient solutions discharged from the growth beds 710a, 710b, 710c, and 710d to the collecting reservoirs 720a, 720b, 720c, and 720d. The irrigating pipe may be provided with an irrigation pump (not shown) for supplying the mixed nutrient solutions from the collecting reservoirs 720a, 720b, 720c, and 720d to the growth beds 710a, 710b, 710c, and 710d.

For example, the mixed nutrient solution supplied from the mixing reservoir 600 to the collecting reservoirs 720a, 720b, 720c, and 720d may vary depending on the nutrient compositions of the waste nutrient solutions discharged from the growth beds 710a, 710b, 710c, and 710d. In addition, the mixed nutrient solution supplied from the mixing reservoir 600 to the collecting reservoirs 720a, 720b, 720c, and 720d may vary depending on growth states of crops growing in the growth beds 710a, 710b, 710c, and 710d. At least one of sensors 730a, 730b, 730c, and 730d, for example, a pH sensor, an EC sensor, a temperature sensor, a turbidity sensor, and a weight sensor, is installed in each of the collecting reservoirs 720a, 720b, 720c, and 720d.

The pH sensor measures changes in the pH of the waste nutrient solutions discharged from the growth beds 710a, 710b, 710c, and 710d to the collecting reservoirs 720a, 720b, 720c, and 720d, and the EC sensor measures changes in electrical conductivities of the waste nutrient solutions, the temperature sensor measures the temperature of the mixed nutrient solution supplied from the collecting reservoirs 720a, 720b, 720c, 720d to the growth beds 710a, 710b, 710c, and 710d, and the turbidity line measures the turbidities of the waste nutrient solutions. The weight sensor measures the weights of the mixed nutrient solutions stored in the collecting reservoirs 720a, 720b, 720c, and 720d or the weights of the waste nutrient solutions.

The measured values of the sensors 730a, 730b, 730c, and 730d are provided to the integrated controller 900. The integrated controller 900 determines the amount of nutrient solution in each component tank 510 to be added to each of the growth beds 710a, 710b, 710c, and 710d provided in the plurality of growth devices 700a, 700b, 700c, and 700d on the basis of the measured values of the sensors 730a, 730b, 730c, and 730d. The integrated controller 900 adjusts the control valve of a selected component tank 510 to supply the determined amount of nutrient solution to each of the growth beds 710a, 710b, 710c, and 710d. Further, the integrated controller 900 may determine the amount of the nutrient solution in each component tank 510 to be added to each of the growth beds 710a, 710b, 710c, and 710d on the basis of the growth state of crops. For reference, the nutrient solution in the component tank 510 selected by the integrated controller 900 is supplied to the collecting reservoirs 720a, 720b, 720c, and 720d first, and then mixed with waste nutrient solutions in the collecting reservoirs 720a, 720b, 720c, and 720d and supplied to each of the growth beds 710a, 710b, 710c, and 710d.

A valve box 800 includes supply control valves 801a, 801b, 801c, and 801d installed in the piping line connecting the mixing reservoir 600 and the collecting reservoirs 720a, 720b, 720c, and 720d of the plurality of growth devices 700a, 700b, 700c, and 700d. The supply control valves 801a, 801b, 801c, and 801d of the valve box 800 operate to allow the nutrient solution of a component tank 510 selected by the integrated controller 900 to be selectively supplied to at least one of the growth beds 710a, 710b, 710c, and 710d through the mixing reservoir 600. Specifically, the supply control valve 801a, 801b, 801c, and 801d allow a mixed nutrient solution to be selectively supplied from the mixing reservoir 600 to each of the collecting reservoirs 720a, 720b, 720c, and 720d of the growth devices 700a, 700b, 700c, and 700d. At this time, when the mixed nutrient solution in the mixing reservoir 600 is supplied to the first collecting reservoir 720a, only the first supply control valve 801a connected to the first collecting reservoir 720a is opened and the remaining supply control valves 801b, 801c and 801d are all closed.

FIG. 4 is a block diagram showing the configuration of the integrated controller 900 illustrated in FIG. 3.

Referring to FIG. 3 and FIG. 4, the integrated controller 900 includes an analysis module 910, a soft measuring module 920, a computing module 930, and a communication module 940, and may further includes an adjusting module (not shown) and an alerting module (not shown).

The analysis module 910 determines the growth states of crops planted in the growth beds 710a, 710b, 710c, and 710d of the growth devices 700a, 700b, 700c, and 700d. For example, the analysis module 910 receives image data obtained by photographing the crops in the growth beds 710a, 710b, 710c, and 710d through the camera C installed at a position adjacent to the growth bed 710a, 710b, 710c, and 710d.

The analysis module 910 analyzes images of the crops and compares at least one of the heights and widths of grown crops, the numbers of leaves/fruits/flowers of the crops, the size of at least one of the leaves/fruits/flowers of the crops, and the colors of the crops with a previously constructed growth DB to determine growth states of the crops.

The analysis module 910 analyzes the images of the crops to determine at least one of growth stages of the crops and disease-and-pest damage states of the crops. For example, the analysis module 910 may determine the type and progress of damage by diseases and pests by using an image analysis algorithm or by comparing crop image data with image data of crops in a normal state stored in the previously constructed growth DB. The method for determining the type and progress of damage by diseases and pests is not necessarily limited thereto.

The soft measuring module 920 measures the composition of nutrient components contained in a waste nutrient solution by applying at least one of the weight, acidity (pH), electrical conductivity (EC), temperature (Temp), and turbidity of the waste nutrient solution, measured by the sensors 730*a*, 730*b*, 730*c*, and 730*d* of the collecting reservoirs 720*a*, 720*b*, 720*c*, and 720*d* of the growth devices 700*a*, 700*b*, 700*c*, and 700*d* to a nutrient composition estimation model constructed in a nutrient composition DB.

For example, the soft measuring module 920 may compare the measured values of the sensors 730*a*, 730*b*, 730*c*, and 730*d*, which are measured from the waste nutrient solution, with the nutrient composition estimation model to determine the type of a nutrient component lacking in the waste nutrient solution.

For example, when there is no or little change in the pH of the waste nutrient solution, it can be considered that the crops have hardly absorbed N ions. The soft measuring module 920 may ascertain the type of a nutrient component lacking in the waste nutrient solution through such change in the pH.

As another example, when the turbidity of the waste nutrient solution is measured to be high, the soft measuring module 920 applies the turbidity value to the nutrient composition estimation model to determine the cause of turbidity. If turbidity is caused by moss, the computing module 430 calculates the amount of each nutrient component such that a nutrient solution capable of creating an environment for removing moss is added to the collecting reservoirs 720*a*, 720*b*, 720*c*, and 720*d*.

The computing module 930 calculates the amount of each nutrient component to be added to the waste nutrient solutions circulated from the collecting reservoirs 720*a*, 720*b*, 720*c*, and 720*d* 320 to the growth beds 710*a*, 710*b*, 710*c*, and 710*d* on the basis of the composition of each nutrient component contained in the waste nutrient solutions in the collecting reservoirs 720*a*, 720*b*, 720*c*, and 720*d*, measured by the soft measuring module 420.

For example, when potassium is insufficient in the waste nutrient solutions stored in the collecting reservoirs 720*a*, 720*b*, 720*c*, and 720*d* due to high absorption of potassium in the crops planted in the growth bed 710*a*, 710*b*, 700*c*, 710*d* of the growth devices 700*a*, 700*b*, 700*c*, and 700*d*, the computing module 930 calculates a supply amount of potassium (nutrient component) to be added to the collecting reservoirs 720*a*, 720*b*, 720*c*, 720*d* from the nutrient solution provider 500.

In addition, the computing module 930 calculates the amount of each nutrient component to be added to the waste nutrient solutions circulated from the collecting reservoirs 720*a*, 720*b*, 720*c*, and 720*d* to the growth beds 710*a*, 710*b*, 710*c*, and 710*d* on the basis of the growth states of the crops determined by the analysis module 910.

For example, when the crops planted in the growth beds 710*a*, 710*b*, 710*c*, and 710*d* have been damaged by diseases and pests (growth state) and thus a specific nutrient component (e.g., calcium) is further required, the computing module 930 calculates a supply amount of calcium (nutrient component) to be additionally supplied from the nutrient solution provider 500 to the collecting reservoirs 720*a*, 720*b*, 720*c*, and 720*d* depending on the progress of damage by diseases and pests or the type of damage by diseases and pests.

The communication module 940 transmits a signal for controlling the control valve for each component tank 510 of the nutrient solution provider 500 to the control valve of the nutrient solution provider 500 according to the result calculated by the computing module 930. For example, when the computing module 930 calculates the supply amount of potassium (nutrient component) to be added to the collecting reservoirs 720*a*, 720*b*, 720*c*, and 720*d* by the nutrient solution provider 100, the communication module 940 transmits, to the control valve, a control signal for controlling the flow rate of a nutrient solution supplied to the mixing reservoir 600 from the component tank 110 in which potassium is stored.

As another example, when the turbidity of a waste nutrient solution is measured to be high in the soft measuring module 920, the turbidity value is applied to the nutrient composition estimation model to determine the cause of turbidity. If the turbidity is caused by moss, the computing module 930 calculates an amount of a nutrient solution (e.g., phosphorous (P)) which can create an environment for removing moss and will be added to the collecting reservoirs 720*a*, 720*b*, 720*c*, and 720*d*. In addition, the communication module 940 transmits, to the control valve, a control signal for adjusting the flow rate of the nutrient solution supplied from the component tank 110 in which phosphorus (P) is stored to the mixing reservoir 600.

The communication module 940 transmits a signal for controlling the supply control valves 801*a*, 801*b*, 801*c*, and 801*d* of the valve box 800 such that a nutrient solution supplied from a component tank 510 of the nutrient solution provider 500 to the mixing reservoir 600 is selectively supplied to the collecting reservoir of a growth device selected from among the plurality of growth devices 700*a*, 700*b*, 700*c*, and 700*d*.

For reference, when the temperatures of the waste nutrient solutions measured by the soft measuring module 920 exceed or decrease to be lower than a growth environment temperature threshold value, the integrated controller 900 may control the internal temperatures of the collecting reservoirs 720*a*, 720*b*, 720*c*, and 720*d* through temperature controllers (not shown) installed in the collecting reservoirs 720*a*, 720*b*, 720*c*, and 720*d*.

Meanwhile, a purifying reservoir including a filter for filtering out impurities in waste nutrient solutions may be additionally provided at the front or rear end of each of the collecting reservoirs 720*a*, 720*b*, 720*c*, and 720*d* of the plurality of growth devices 700*a*, 700*b*, 700*c*, and 700*d*. Although the purifying reservoir can purify waste nutrient solutions through a physical method such as a filter, it may also purify waste nutrient solutions through a chemical method.

On the other hand, at least one of a pH sensor, an EC sensor, a temperature sensor, a weight sensor, and a turbidity sensor may be installed in the mixing reservoir 600. The integrated controller 900 may further include an adjusting module (not shown) and an alerting module (not shown).

The adjusting module measures the composition of each nutrient component contained in the original solution by applying at least one of measured values of the sensors installed in the mixing reservoir 600, that is, the weight, acidity (pH), electrical conductivity (EC), temperature (Temp.), and turbidity of the original solution in the mixing reservoir 600, to a nutrient composition estimation model.

The adjusting module compares the measured composition of the original solution with the composition of the original solution actually supplied by the integrated controller 900 and reflects a difference value according to the comparison in the nutrient composition estimation model to update the estimation model. Since the nutrient composition estimation model is continuously updated by the adjusting module, it is possible to correct measurement errors of the sensors by adjusting difference values caused by differences between the estimation model constructed in the laboratory and the environment of the actual cultivation site.

For example, when a measured value of at least one of the pH sensor, the EC sensor, the temperature sensor, the weight sensor, and the turbidity sensor has an error due to deterioration of the sensor, the adjusting module adjusts the error of the corresponding sensor.

The alerting module determines that the service life of at least one of the pH sensor, the EC sensor, the temperature sensor, and the weight sensor installed in the mixing reservoir 600 has expired if the difference between the composition of the original solution supplied to the mixing reservoir 600 and the composition of the actually supplied original solution, compared by the adjusting module, exceeds a preset threshold value, and provides an alarm to a user.

The integrated controller 900 may determine the type and supply amount of the original nutrient solution initially supplied from the nutrient solution provider 500 to the mixing reservoir 600 according to the growth state (or growth stage) of the crops in each of the growth beds 710*a*, 710*b*, 710*c*, and 710*d* on the basis of a nutrient consumption model previously constructed in a nutrient composition DB 921.

The nutrient consumption model stores types and supply amounts of nutrients required according to growth states (or growth stages) of crops, i.e., the heights and widths of grown crops, the numbers of leaves/fruits/flowers of crops, the size of at least one of the leaves/fruits/flowers of crops, and the colors of crops in advance.

The integrated controller 900 determines the growth stages of the crops planted in the growth beds 710*a*, 710*b*, 710*c*, and 710*d* on the basis of results of analysis of images captured by the camera C, and inputs the determined growth stages and the cultivation scales of the growth beds 710*a*, 710*b*, 710*c*, and 710*d* 310 into the nutrient consumption model. Then, the integrated controller 900 adjusts the nutrient types and supply amount of the original solution initially supplied from the nutrient solution provider 500 to the mixing reservoir 600 by controlling the control valves V1 of the plurality of component tanks 510 provided in the nutrient solution provider 500 according to result values of the nutrient consumption model.

When the original solution is initially supplied to the mixing reservoir 600, it is possible to minimize and optimize consumption of the original solution from the beginning in addition to recycling a waste nutrient solution by providing the composition and amount of the original solution expected to be optimal according to the growth states of crops, as compared to the case of supplying the original solution without a special standard.

Although the present invention has been described with reference to several embodiments of the present invention, those of ordinary skill in the art can understand that the present invention can be modified and changed in various manners without departing from the spirit and scope of the present invention described in the claims below.

In particular, the controllers in the first and second embodiments may be mounted as an on-device in a camera, and thus the cameras including the controllers in the first and second embodiments may operate as edge computing devices.

In addition, the partial functions of the above-described device or system may be provided by being included in a computer-readable recording medium by tangibly implementing a program of instructions for implementing the same. A computer-readable recording medium may include program instructions, data files, data structures, etc. alone or in combination. Examples of the computer-readable recording medium include magnetic media such as hard disks, floppy disks and magnetic tapes, optical media such as CD-ROMs and DVDs, magneto-optical media such as floptical disks, and hardware devices specially configured to store and carry out program instructions, such as ROMs, RAMS, flash memories, and USB memories.

The present invention was derived in the course of performing R&D project of KETEP.

Assignment identification number: 1415174708

Assignment number: 20212020800050

Department name: Ministry of Trade, Industry and Energy

Specialized research and management institute: Korea Energy Technology Evaluation and Planning Research project name: Energy demand management core technology development Research project name: Development and demonstration of rooftop greenhouse type smart green building convergence system based on multiple distributed power generation Contribution rate: 1/1

Name of project performing organization: Shelpa Space Co., Ltd.

Research period: 2020 May 1~2022 Dec. 31

What is claimed is:

1. A nutrient solution recycling plant cultivation system comprising:
   a nutrient solution provider including a plurality of component tanks provided for respective nutrient components, and control valves provided for the respective component tanks;
   a mixing reservoir configured to mix an original solution supplied from the nutrient solution provider and water supplied from the outside and discharge a nutrient solution mixture;
   a collecting reservoir for collecting and storing a waste nutrient solution discharged from a cultivation bed;
   a purifying reservoir, disposed at the front or rear end of the collecting reservoir and provided with a filter, configured to filter out impurities in the waste nutrient solution before the waste nutrient solution is mixed with the nutrient solution mixture supplied from the mixing reservoir;
   a plurality of sensors including a pH sensor, an EC sensor, and a temperature sensor sensing acidity (pH), electrical conductivity (EC), and temperature (Temp) of the waste nutrient solution, respectively, before the waste nutrient solution is mixed with the nutrient solution mixture from the mixing reservoir,
   wherein the collecting reservoir is configured to, after the pH sensor, the EC sensor, and the temperature sensor sense the acidity (pH), the electrical conductivity (EC) and the temperature (Temp) of the waste nutrient solution, mix the waste nutrient solution with the nutrient solution mixture supplied from the mixing reservoir and circulate a waste solution-nutrient solution mixture to the cultivation bed;
   an irrigation pump for transferring the waste solution-nutrient solution mixture in the collecting reservoir to the cultivation bed;
   a camera for photographing crops; and
   a controller configured to determine, using image data of the camera, a growth state of the crops including at least one of a growth stage of the crops and a disease-and-pest damage state of the crops, determine, before the waste nutrient solution is mixed with the nutrient solution mixture, a composition of the nutrient components in the waste nutrient solution, indicating which and how much each nutrient component remains in the waste nutrient solution stored in the collecting reservoir by applying sensed values of the acidity (pH), the electrical conductivity (EC), and the temperature (Temp) of the waste nutrient solution, sensed by the pH sensor, the EC sensor, and the temperature sensor, to a nutrient component estimation model constructed and stored in advance in a nutrient composition DB, calculate a specific target amount of each nutrient component to be added to the waste nutrient solution based on the determined composition of the nutrient components, indicating which and how much each nutrient component remains in the waste nutrient solution and the determined growth state of crops, and transmit a control signal to a control valve for each component tank of the nutrient solution provider according to the calculated specific target amount of each nutrient component.

2. The nutrient solution recycling plant cultivation system according to claim 1, wherein at least one of the pH sensor, the EC sensor, the temperature sensor, a weight sensor, and a turbidity sensor is installed in the collecting reservoir, and the controller is further configured to measure a composition of each nutrient component contained in the original solution by applying at least one of the weight, acidity (pH), electrical conductivity (EC), temperature (Temp), and turbidity of the original solution to the nutrient composition estimation model, comparing the measured composition of the original solution with a composition of the original solution actually supplied by the controller, and reflecting a different value according to comparison in the nutrient composition estimation model to update the estimation model.

3. The nutrient solution recycling plant cultivation system according to claim 2, wherein the controller is further configured to determine that at least one of the pH sensor, the EC sensor, the temperature sensor, and the weight sensor has passed a service life and provide an alarm to a user when the difference value according to comparison exceeds a preset threshold value.

4. The nutrient solution recycling plant cultivation system according to claim 1, wherein the controller is further configured to input the determined growth state of the crops into a previously constructed nutrient consumption model to derive a type and consumption amount of a nutrient component of the original solution expected to be consumed, and control the control valves of the component tanks according to derived expected values.

5. A nutrient solution recycling plant cultivation system comprising:

a nutrient solution provider including a plurality of component tanks provided for respective nutrient components, and control valves provided for the respective component tanks;

a mixing reservoir configured to mix an original solution supplied from the nutrient solution provider and water supplied from the outside and discharge a nutrient solution mixture;

a plurality of growth devices including
growth beds,
collecting reservoirs for collecting and storing waste nutrient solutions discharged from growth beds,
purifying reservoirs, disposed at the front or rear end of the collecting reservoirs and provided with filters, configured to filter out impurities in the waste nutrient solutions before the waste nutrient solutions are mixed with the nutrient solution mixture supplied from the mixing reservoir,
a plurality of sensors including a pH sensor, an EC sensor, and a temperature sensor sensing acidity (pH), electrical conductivity (EC), and temperature (Temp) of the waste nutrient solution, respectively, before the waste nutrient solutions are mixed with the nutrient solution mixture from the mixing reservoir,
wherein the collecting reservoirs are configured to, after the pH sensor, the EC sensor, and the temperature sensor sense the acidity (pH), the electrical conductivity (EC) and the temperature (Temp) of the waste nutrient solutions, mix the waste nutrient solutions with the nutrient solution mixture supplied from the mixing reservoir and circulate waste solution-nutrient solution mixtures to the growth beds, and
an irrigation pump for transferring the waste solution-nutrient solution mixture in the collecting reservoir to the growth beds; and
a camera for photographing crops;

a valve box including supply control valves installed in a piping line connecting the mixing reservoir and the collecting reservoirs of the plurality of growth devices; and an integrated controller configured to determine, using image data of the camera, a growth state of the crops being cultivated in each growth device including at least one of a growth stage of the crops and a disease-and-pest damage state of the crops, determine, before the waste nutrient solutions are mixed with the nutrient solution mixture, a composition of the nutrient components in the waste nutrient solutions, indicating which and how much each nutrient components contained in the waste nutrient solutions stored in the collecting reservoirs of each growth device by applying sensed values of the acidity (pH), the electrical conductivity (EC), and the temperature (Temp) of the waste nutrient solutions, sensed by the pH sensor, the EC sensor, and the temperature sensor, to a nutrient component estimation model constructed and stored in advance in a nutrient composition DB, calculate a specific target amount of each nutrient component to be added to the waste nutrient solution based on the determined composition of the nutrient components, indicating which and how much each nutrient component remains in the waste nutrient solutions and the determined growth state of crops, and transmit a control signal to the control valve and the supply control valves of the valve box of the growth devices according to the calculated specific target amount of each nutrient component.

6. The nutrient solution recycling plant cultivation system according to claim 5, wherein at least one of the pH sensor, the EC sensor, the temperature sensor, a weight sensor, and a turbidity sensor is installed in the collecting reservoir, and the integrated controller is further configured to measure a composition of each nutrient component contained in the original solution in the mixing reservoir by applying at least one of the weight, acidity (pH), electrical conductivity (EC), temperature (Temp), and turbidity of the original solution to the nutrient composition estimation model, comparing the measured composition of the original solution with a composition of the original solution actually supplied by the controller, and reflecting a difference value according to comparison in the nutrient composition estimation model to update the estimation model.

7. The nutrient solution recycling plant cultivation system according to claim 6, wherein the integrated controller is further configured to determine that at least one of the pH sensor, the EC sensor, the temperature sensor, and the weight sensor has passed a service life and provide an alarm to a user when the difference value according to comparison exceeds a preset threshold value.

8. The nutrient solution recycling plant cultivation system according to claim 5, wherein the integrated controller is further configured to input the determined growth state of each kind of crop into a previously constructed nutrient consumption model to derive a type and consumption amount of a nutrient component of the original solution expected to be consumed, and control the control valves of the component tanks according to derived expected values.

\* \* \* \* \*